(No Model.)
T. S. BROWN.
FISHING NET.
No. 325,652. Patented Sept. 8, 1885.
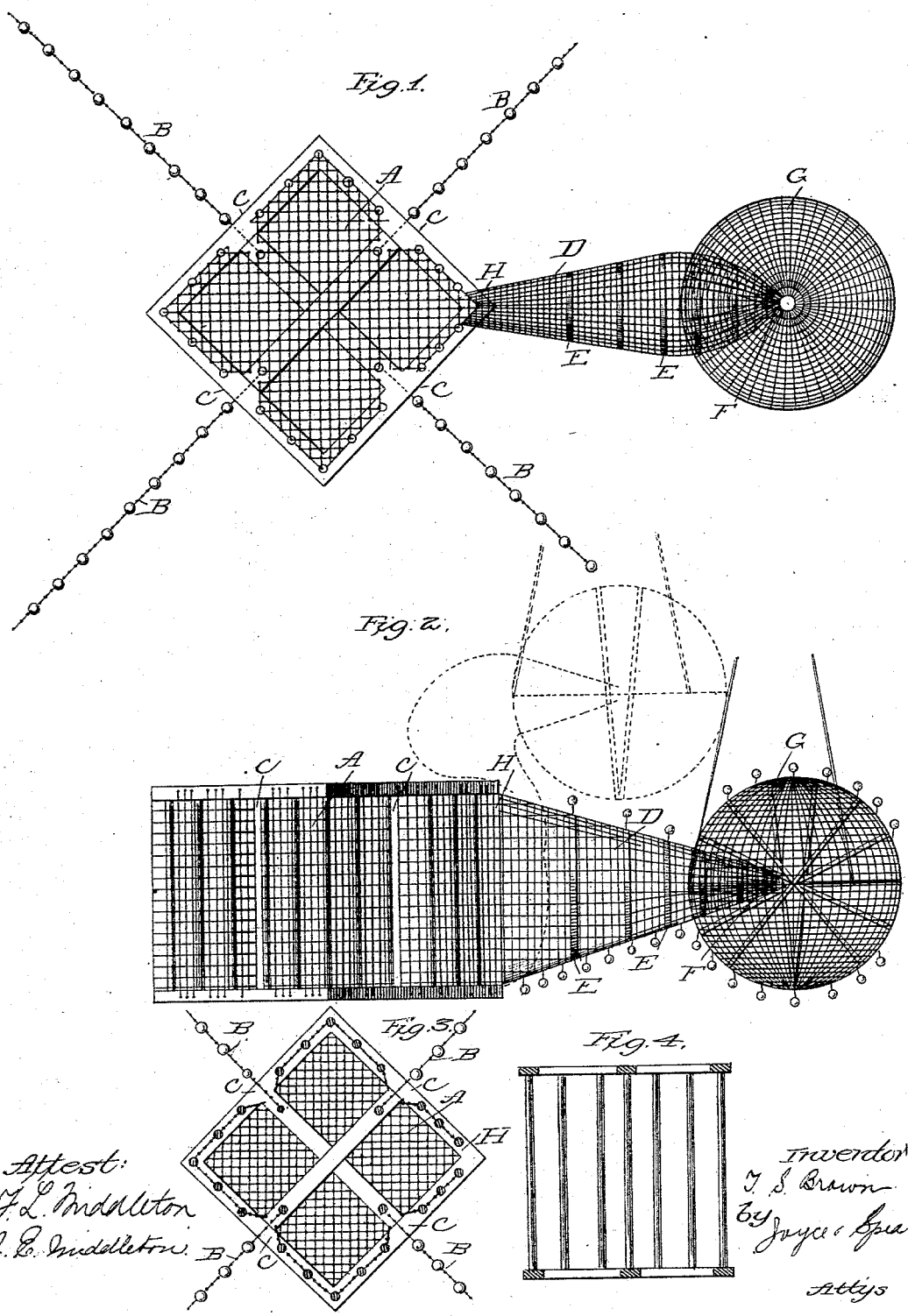

UNITED STATES PATENT OFFICE.

THOMAS S. BROWN, OF GREENFIELD, MICH., ASSIGNOR OF ONE-HALF TO WM. D. LOBIN AND D. FARRAND HENRY, BOTH OF DETROIT, MICH.

FISHING-NET.

SPECIFICATION forming part of Letters Patent No. 325,652, dated September 8, 1885.

Application filed August 16, 1884. (No model.)

*To all whom it may concern:*

Be it known that I, THOMAS S. BROWN, of Greenfield, Michigan, have invented a new and useful Improvement in Fishing-Nets for Deep Water, which improvement is fully set forth in the following specification, reference being had to the accompanying drawings, in which—

Figure 1 represents a plan, Fig. 2 a side elevation, of the net, the leaders in this view being omitted; Figs. 3 and 4, a plan and vertical section of the frame around which the part of the net forming the pound is secured.

Similar letters indicate corresponding parts in the drawings.

My invention relates to an arrangement for setting and using pound-nets in deep water, where the said nets will be protected from the action of the waves, and the fish removed therefrom alive at any time without disturbing the pound.

In the drawings, A represents a pound, as ordinarily used, except that, instead of being fastened to stakes, a frame is used, the net covering it completely, at the top as well as the sides and bottom, as customary, having leaders or wings B running from it in different directions, with entrances C. These leaders can be made of any length, and there may be four of them, as shown, or any other number best adapted to the place where the net is set.

At one side of the pound is an opening, H, which is the entrance to the tunnel D. This tunnel is distended by hoops E, and narrows at the outer end to a mouth, F. It has attached to it a bag or purse, G. The tunnel is somewhat longer than the depth of water where the net is set, so that the purse G can be raised to the surface without disturbing the pound A.

The frame of the pound A is loaded with weights, which sink and keep it firm on the bottom, and the leaders B are kept in position by anchor-weights fastened to the bottom and floats to the top of the net, and they may also be guyed by lines running to larger anchors properly placed.

The tunnel D is secured by weights placed at the bottom and floats at the top of the hoops E, and the purse G is similarly fixed by proper weights and floats.

The method of operation is as follows: The fishing-ground having been selected, the pound A is lowered to the bottom. Then the leaders B are carried out and lowered, the weights sinking them, and the floats keeping the net upright, and they are guyed to anchors placed at a distance, if necessary. The tunnel D and purse G, being lowered, assume their proper positions, and the hauling-lines are properly buoyed. Now, the fish swimming along near the bottom, as is their habit, strike the leaders B, and follow them to the pound A, which they enter at the openings C, but out of which they cannot pass, and swimming round they find the opening H to the tunnel D. Following the tunnel they pass through its mouth F into the purse G, where they are confined, not being able to pass back through the mouth F into the tunnel. A boat being in position over the net, the purse G and its contents can be lifted to the surface, as shown by dotted lines in Fig. 2, the tunnel being of sufficient length not to disturb the main net, and the fish in it taken out by means of a dip-net or otherwise and loaded into the boat. These operations can be carried on at any depth of water and in any weather where gill-nets can be handled.

What I claim, and desire to secure by Letters Patent, is—

In a deep-water net, the combination of a central pound or inclosed space having guarded openings with leaders radiating therefrom, with a tunnel having at its end a bag or purse with guarded opening, substantially as described, and for the purposes set forth.

In testimony whereof I have signed my name to this specification in the presence of two subscribing witnesses.

THOMAS S. BROWN.

Witnesses:
D. FARRAND HENRY,
HERSCHEL WHITAKER.